US005814813A

United States Patent [19]

Cotter et al.

[11] Patent Number: 5,814,813

[45] Date of Patent: Sep. 29, 1998

[54] END CAP REFLECTION FOR A TIME-OF-FLIGHT MASS SPECTROMETER AND METHOD OF USING THE SAME

[75] Inventors: Robert J. Cotter; Timothy J. Cornish, both of Baltimore, Md.

[73] Assignee: The Johns Hopkins University, Baltimore, Md.

[21] Appl. No.: 677,033

[22] Filed: Jul. 8, 1996

[51] Int. Cl.[6] .............................. B01D 59/44; H01J 49/00

[52] U.S. Cl. .............................. 250/287; 250/282

[58] Field of Search .............................. 250/281, 282, 250/287, 396 R

[56] References Cited

U.S. PATENT DOCUMENTS

| | | | |
|---|---|---|---|
| 2,161,466 | 6/1939 | Henneberg | 250/27.5 |
| 3,727,047 | 4/1973 | Janes | 250/41.9 |
| 4,126,781 | 11/1978 | Siegel | 250/396 R |
| 4,611,118 | 9/1986 | Managadze | 250/287 |
| 4,625,112 | 11/1986 | Yoshida | 250/287 |
| 4,704,532 | 11/1987 | Hua | 250/396 R |
| 4,731,532 | 3/1988 | Frey | 250/287 |
| 4,737,688 | 4/1988 | Collins | 315/111.21 |
| 5,017,780 | 5/1991 | Kutscher | 250/287 |
| 5,077,472 | 12/1991 | Davis | 250/287 |
| 5,120,958 | 6/1992 | Davis | 250/287 |
| 5,160,840 | 11/1992 | Vestal | 250/287 |
| 5,180,914 | 1/1993 | Davis et al. | 250/287 |
| 5,300,774 | 4/1994 | Buttrill, Jr. | 250/287 |
| 5,464,985 | 11/1995 | Cornish | 250/396 |

FOREIGN PATENT DOCUMENTS 0 551 999 A1 8/1993 European Pat. Off. .

OTHER PUBLICATIONS

"Time–of–Flight Mass Spectrometer with Improved Resolution"; W. C. Wiley and I.H. McLaren; *The Review of Scientific Instruments*; vol. 26, No. 12; Dec. 1955.

"High–Resolution Time–Of–Flight Mass Spectrometry Theory Of The Impulse–Focused Tme–Of–Flight Mass Spectrometer"; N.L. Marable and George Sanzone; *International Journal of Mass Spectrometry and Ion Physics*; 13 (1974) 185–194.

"Velocity Compaction—Theory and Performance"; M. Luis Muga; *Analytical Instrumentation*; 16(1), 31–50 (1987).

"Models For Mass–Independent Space and Energy Focusing In Time–Of–Flight Mass Spectrometry"; George E. Yefchak and Christie G. Enke; *International Journal of Mass Spectrometry and Ion Processes*; 87 (1989) 313–330.

"Post Source Pulse Focusing: A Simple Method To Achieve Improved Resolution In A Time–Of–Flight Mass Spectrometer"; Gary r. Kinsel and Murray V. Johnston; *International Journal of Mass Spectrometry and Ion Processes*; 91 (1989) 157–176.

"Time–of–flight Mass Spectrometry with a Compact Two–stage Electrostatic Mirror: Metastable–ion Studies with High Mass Resolution and Ion Emission from Thick Insulators"; A. Brunelle, S. Della–Negra, J. Depauw, H. Joret and Y. Le Beyec; *Rapid Communications in Mass Spectrometry*; vol. 5, No. 1, 1991.

(List continued on next page.)

*Primary Examiner*—Bruce Anderson
*Attorney, Agent, or Firm*—Cushman Darby & Cushman IP Group of Pillsbury Madison & Sutro LLP

[57] ABSTRACT

A reflectron for use with a mass spectrometer that focuses ions having different energies contains a conductive end cap that is electrically connected to a first voltage. A conductive surface is electrically isolated from the end cap and connected to a second voltage. This conductive surface cooperates with the conductive end cap to establish an inner region in which a non-linear electric field exists. As a result, ions having different energies enter and exit the inner region at a common opening and, when within the inner region, are reflected without penetrating past the conductive surface.

31 Claims, 8 Drawing Sheets

OTHER PUBLICATIONS

"A Time–of–flight Mass Analyzer with High Resolving Power"; R. Grix, R. Kutscher, G. Li, U. Gruner and H. Wollnik; *Rapid Communications in Mass Spectrometry*; vol. 2, No. 5, 1988.

"Improved Energy Compensation for Time–of–Flight Mass Spectrometry"; R. T. Short and P. J. Todd; *American Society for Mass Spectrometry*; 1994, 5, 779–787.

Sequencing of peptides in a time–of–flight mass spectrometer: evaluation of postsource decay following matrix–assisted laser desorption ionisation (MALDI); R. Kaufmann, D. Kirsch, B. Spengler; *International Journal of Mass Spectrometry and Ion Processes*; 131 (1994) 355–385.

"A Curved Field Reflectron Time–of–Flight Mass Spectrometer for the Simultaneous Focusing of Metastable Product Ions"; Timothy J. Cornish and Robert J. Cotter; *Rapid Communications in Mass Spectrometry*; vol. 8, 781–785 (1994).

The mass–reflectron, a new nonmagnetic time–of–flight mass spectrometer with high resolution; B.A. Mamyrin, V.I. Karatawv, D.V. Shmikk, and V.A. Zagulin; *Sov.Phys.–JETP*; vol. 37, No. 1, Jul. 1973.

A Curved–field Reflectron for Improved Energy Focusing of Product Ions in Time–of–flight Mass Spectrometry; Timothy J. Cornish and Robert J. Cotter; *Rapid Communications in Mass Spectrometry*; vol. 7, 1037–1040 (1993).

END CAP REFLECTION FOR A TIME-OF-FLIGHT MASS SPECTROMETER AND METHOD OF USING THE SAME

This invention was made with government support under grant GM33967 awarded by the National Institute of Health. The government has certain rights in this invention.

BACKGROUND OF THE INVENTION

1. Field of the Invention

The present invention relates to a non-linear field reflectron for a time-of-flight mass spectrometer and method of using the same, and more particularly, a non-linear field reflectron having a simple electrode geometry rather than a series of field-defining lens elements to create a reflecting electric field which does not undesireably disturb ion trajectories.

2. Background of the Related Art

Mass spectrometers are instruments that are used to determine the chemical composition of substances and the structures of molecules. In general they consist of an ion source where neutral molecules are ionized, a mass analyzer where ions are separated according to their mass/charge ratio, and a detector. Mass analyzers come in a variety of types, including magnetic field (B) instruments, combined electrical and magnetic field or double-focusing instruments (EB or BE), quadrupole electric field (Q) instruments, and time-of-flight (TOF) instruments. In addition, two or more analyzers may be combined in a single instrument to produce tandem (MS/MS) mass spectrometers. These include triple analyzers (EBE), four sector mass spectrometers (EBEB or BEEB), triple quadrupoles (QqQ) and hybrids (such as the EBqQ).

In tandem mass spectrometers, the first mass analyzer is generally used to select a precursor ion from among the ions normally observed in a mass spectrum. Fragmentation is then induced in a region located between the mass analyzers, and the second mass analyzer is used to provide a mass spectrum of the product ions. Tandem mass spectrometers may be utilized for ion structure studies by establishing the relationship between a series of molecular and fragment precursor ions and their products. Alternatively, they are now commonly used to determine the structures of biological molecules in complex mixtures that are not completely fractionated by chromatographic methods. These may include mixtures of (for example) peptides, glycopeptides or glycolipids. In the case of peptides, fragmentation produces information on the amino acid sequence.

Time-of-flight mass spectrometers. The simplest version of a time-of-flight mass spectrometer, illustrated in FIG. 1, consists of a short source region 10, a longer field-free drift region 12 and a detector 14. Ions are formed and accelerated to their final kinetic energies in the short source region 10 by an electrical field defined by voltages on a backing plate 16 and drawout grid 18. The longer field-free drift region 12 is bounded by drawout grid 18 and an exit grid 20.

In the most common configuration, the drawout grid 18 and exit grid 20 (and therefore the entire drift length) are at ground potential, the voltage on the backing plate 16 is V, and the ions are accelerated in the source region to an energy: $mv^2/2=eV$, where m is the mass of the ion, v is its velocity, and e is the charge on an electron. The ions then pass through the drift region 12 and their (approximate) flight times:

$$t=\left(\frac{m}{2eV}\right)^{1/2}D \quad (1)$$

show a square root dependence upon mass. Typically, the source region 10 length (s) is of the order of 0.5 cm, while drift lengths (D) ranges from 15 cm to 8 meters. Accelerating voltages (V) can range from a few hundred volts to 30 kV, and flight times are of the order of 5 to 100 microseconds.

Reflectron time-of-flight mass spectrometers. Mass resolution in time-of-flight mass spectrometers is limited by initial distributions in the location of the ions in the extraction field of the source (spatial distribution) and their initial kinetic energies (kinetic energy distribution).

In static instruments (those in which voltages do not vary with time) it is not possible to simultaneously focus ions having both spatial and kinetic energy distributions. As a result, static instruments address attempts to eliminate one of these distributions and then correct for the other. In one known method primarily used when kinetic distributions predominate, ions are desorbed from equipotential surfaces, which effectively eliminates the initial spatial distribution and requires correction only for kinetic energies. Alternatively, when spatial distributions predominate, ions are focused in time at a space-focus plane, where their initial spatial distributions are effectively converted to a kinetic energy distribution. In either case, it is possible to compensate for the kinetic energy distributions using a reflectron (or ion mirror).

A conventional reflectron is essentially a retarding electrical field which decelerates the ions to zero velocity, and allows them to turn around and return along the same or nearly the same path. Ions with higher kinetic energy (velocity) penetrate the reflectron more deeply than those with lower kinetic energy, and thus have a longer path to the detector. Ions retain their initial kinetic energy distributions as they reach the detector; however, ions of the same mass will arrive at essentially the same time.

The most common reflectrons are either single-stage reflectrons, such as single-stage reflectron 30 illustrated in FIG. 2A or dual-stage reflectrons such as dual-stage reflectron 32 illustrated in FIG. 2B. In both single-stage and dual-stage reflectrons, a stack of electrodes 34 (also called ion lenses), each connected resistively to one another, provide constant retarding field regions that are separated by one grid 36 in the single stage reflectron 30 or by/between certain of the two grids 38 and 40 in the dual-stage reflectron 32 that are placed between the stages or between the reflectron and linear ($L_1$ and $L_2$) regions to minimize field penetration. In the most common case, both grids and lenses are constructed using ring electrodes. In the case of grids such as 36, 38, 40, illustrated in FIGS. 2A and 2B, these ring electrodes are covered with a thin wire mesh.

In single-stage reflectrons, a single retarding region is used as illustrated in FIG. 3A and (approximate) ion flight times:

$$t=\left(\frac{m}{2eV}\right)^{1/2}[L_1+L_2+4d] \quad (2)$$

have the same square-root dependence expressed in Equation 1. The additional terms to those expressed in Equation (1) are $L_1$, $L_2$ and d. $L_1$ and $L_2$ are the lengths of the linear regions illustrated in FIG. 2, and d is the average penetration depth. Maximum (first-order) focusing is achieved when $L_1+L_2=4d$.

Dual-stage reflectrons utilize two retarding regions, such as illustrated in FIG. 3B, and can be designed to focus to second order. Approximate second order focusing can be achieved for dual-stage reflectrons in which ions lose approximately ⅔ of their initial kinetic energy in the first 10% of the reflectron depth, and the combined length of $L_1$ and $L_2$ is approximately 8–10 times the average penetration depth.

While reflectrons were originally intended to improve mass resolution for ions formed in an ion source region, they have more recently been exploited for recording the mass spectra of product ions formed outside the source by metastable decay or by fragmentation induced by collisions with a target gas or surface, or by photodissociation.

Gridless reflectrons i.e., those in which only ion lenses are utilized, have also been designed, as have three-stage reflectrons, intended to compensate for the time spent in the source region.

While it has been recognized that quadratic reflectrons in which the retarding electric field is defined by voltages proportional to the square of the depth, such as illustrated in FIG. 3C, should provide energy focusing to infinite order, i.e independent of energy, such quadratic reflectrons have been difficult to design and construct. A primary reason for this difficulty is that it is difficult to establish a retarding electric field which is truly proportional to the theoretically desired field for each point in the reflectron.

Attempts to establish this retarding electric field have used multiple electrodes, such as electrodes 42A–42N and grid 41 illustrated in FIG. 4, that are resistively coupled together with resistors 44A–M so that each electrode is supplied with a voltage corresponding to that desired by its location in the reflectron. When a retarding voltage V1 is thus applied to the rear electrode 42N, the retarding electric field is created. This retarding electric field in fact fails to establish the theoretically desired retarding field, especially at points along the center line 46 of the reflectron resulting in field gradients in the radial direction 48. As a result, the ions, which penetrate through multiple electrodes before being reflected, have their trajectories undesireably altered and considerable loss of ion transmission occurs. Similar problems exist for other "non-linear" field reflectrons, such as the Non-Linear Field Reflectron described in U.S. Pat. No. 5,464,985 since the retarding electric field obtained therefrom and shown in FIG. 3D is obtained using multiple electrodes through which the ions must penetrate. Published European Patent Application EPO 551,999 (1993) by S. C. Davis and S. Evans proposes a quadratic reflectron 50 using a monopole geometry, illustrated in FIGS. 5A and 5B that does not require the use of resistively-coupled ring electrode elements. While this quadratic reflectron in principle provides a quadratic voltage dependence on reflectron depth along the center line 52 that the ions travel, in practice this quadratic reflectron is compromised by the localized (defocusing) fields produced by the ion entrance/exit slit 54 through which the ions must penetrate.

SUMMARY OF THE INVENTION

It is therefore an object of the present invention to provide a reflectron which provides a more uniform non-linear retarding electric field without the use of resistively-coupled ring electrodes.

It is another object of the present invention to provide a reflectron from a simple arrangement of two electrodes that allow various retarding electric fields to be established.

It is a further object of the present invention to provide a mass spectrometer which uses a reflectron that provides a more uniform retarding electric field and utilize a simple arrangement of electrodes such that ions can be efficiently injected without penetrating the electrodes through entrance/exit holes or slits that distort the retarding field or disturb ion trajectories.

It is still a further object of the present invention to provide a mass spectrometer which can adequately compensate for ions having different energies so that ions formed by fragmentation in a linear region of the mass spectrometer can be focused without changing the reflectron voltage.

In order to attain the above recited objects of the invention, among others, the present invention provides a reflectron for use with a mass spectrometer that focuses ions having different energies. This reflectron contains a conductive end cap that is electrically connected to a first voltage. A second conductive surface is insulated from the end cap and connected to a second voltage that is lower (for positive ions) or higher (for negative ions) than the first voltage. This conductive surface cooperates with the conductive end cap to establish an inner region in which a non-linear retarding electric field, defined by voltages that are substantially quadratic with respect to depth, exists along the ion flight path. As a result, ions having different energies enter and exit the inner region at a common opening without penetrating past the conductive surface.

In one preferred embodiment, the conductive surface is a cylinder and the conductive end cap has a circular shape corresponding to the diameter of the cylinder, which results in an inner region that has a substantially cylindrical shape.

In another embodiment, the conductive end cap has a substantially rectangular shape and the conductive surface is a pair of parallel electrodes, which results in an inner region that has a substantially boxlike shape.

The position of the end cap can be adjusted from outside of a vacuum chamber in which it is disposed to allow for efficient focusing of the injected ions over a range of linear region lengths.

A mass spectrometer which uses the reflectron having an end cap with a circular shape allows ions to be injected through the open end of the cylindrical region in which there exists the non-linear retarding electric field that reflects the ions back toward a detector.

Using this invention thus precludes the need to use electrodes which have slits or holes in their conductive surfaces, through which ions must pass. As a result, undesired distortion of the retarding electric field is avoided.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 6:
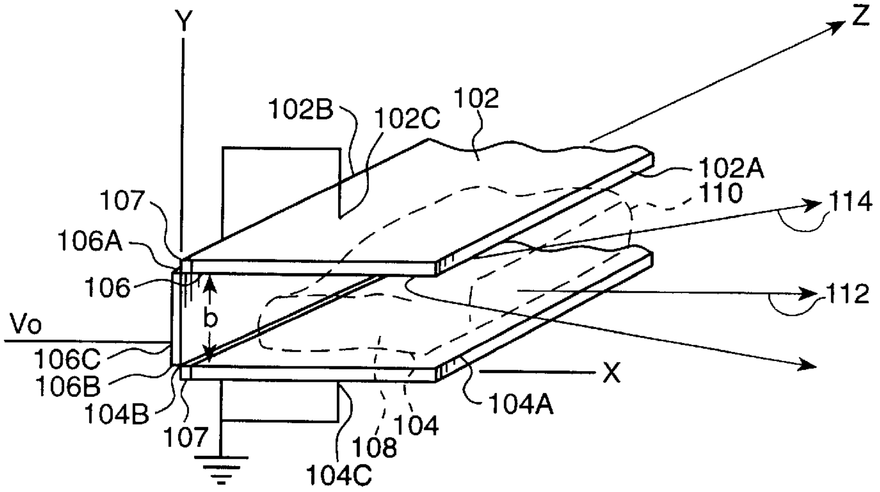
FIG. 6 illustrates a reflectron using an end cap according to a first embodiment of the present invention.

FIG. 6 illustrates a first embodiment of an end cap reflectron 100 according to the present invention. This reflectron 100 includes a conductive top electrode 102, a conductive bottom electrode 104 and a conductive end cap 106. The conductive top electrode 102, the conductive bottom electrode 104 and the conductive end cap 106 are each formed of 0.25" thick stainless steel and form an inner region 108 having planar conductive surfaces electrically isolated from each other by insulator 107 and cooperate to establish a retarding electric field when voltages are applied thereto, as discussed hereinafter. Insulator 107 is preferably about 0.1" of empty space, but can also be ceramic or other non-conductive materials.

The end cap electrode 106 is rectangular, having a width (b) along the y-axis which allows a spacing between the conductive top electrode 102 and the conductive bottom electrode 104 of 2.0". The length (along the x-axis) of the conductive top electrode 102 and the conductive bottom electrode 104 is about 2.0", so that the opening 110 at the ion entrance/exit ends 102A and 104A is about 2.0" from the end cap connection ends 102B and 104B. In general, the length of the conductive top 102 and bottom 104 electrodes is approximately the same as the gap between them and the width (b) of the end cap electrode 106. The top and bottom electrode ends 102B and 104B are disposed by the end cap connection ends 106A and 106B, respectively, with insulator 107 electrically isolating them from one another. The width (along the z-axis) of the conductive top electrode 102, the conductive bottom electrode 104 and the conductive end cap 106 is at least 4" so that the retarding electric field created within the region 110 is undisturbed in the vicinity of ion trajectories by the electrode boundaries which may otherwise adversely affect performance.

A voltage conductor connects to the end cap 106 at any point on the outside surface, such as connection point 106C. A ground conductor connects the conductive top electrode 102 and the conductive bottom electrode 104 to any point on their outer surface, such as points 102C and 104C. The voltage applied via the connection point 106C to the end cap 106, will in general be a DC voltage having a level at least greater in magnitude than the voltage applied to a backing plate (not shown), and preferably be 10% greater in magnitude than the backing plate voltage. For a reflectron of the scale described herein, the length of the conductive top and bottom electrodes and the width of the end cap electrode can be in the range of 1.5" to 2.5". For these electrode dimensions, backing plate voltages of about 150–2000 volts are used.

As illustrated on FIG. 6, this reflectron 100 thus has a central axis 112, which is used to determine the appropriate ion path 114.

Figure 7:
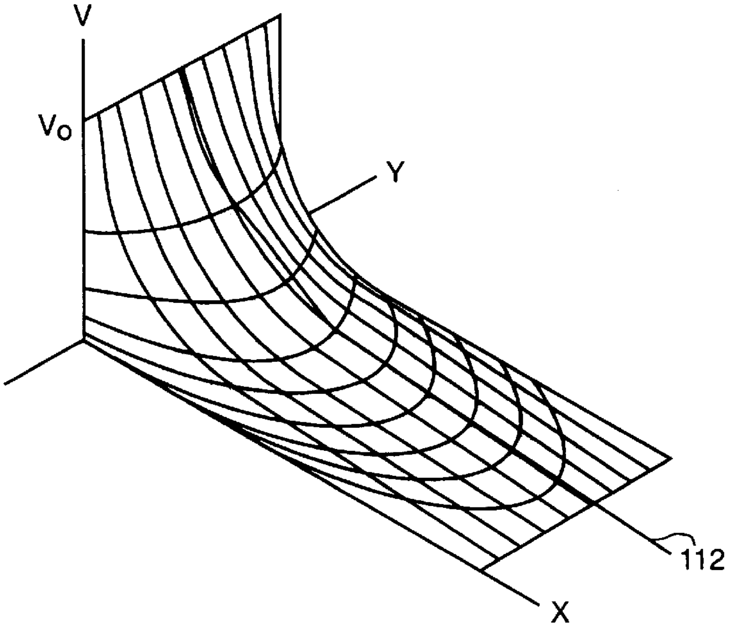
FIG. 7 illustrates the equipotential lines obtained using the end cap reflectron according to the first embodiment of the present invention.
Figure 8:
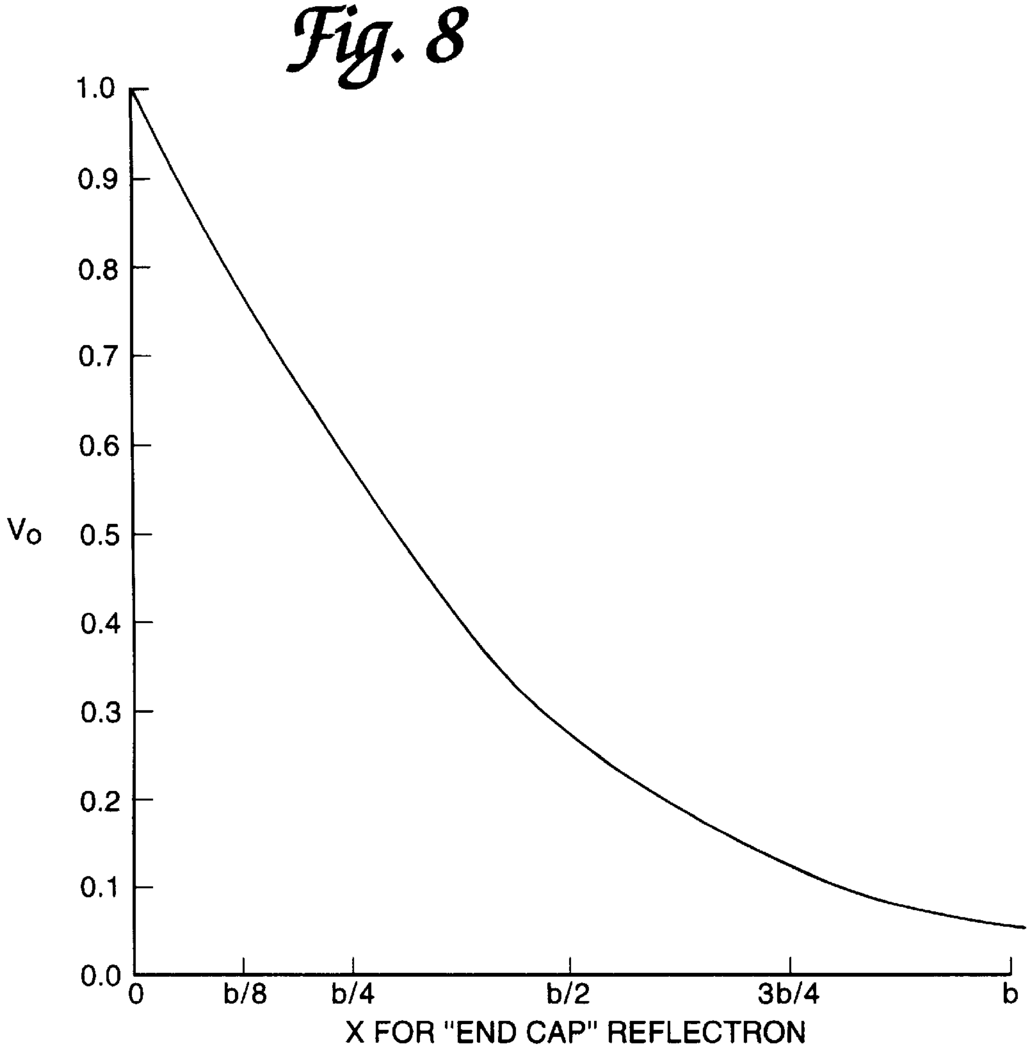
FIG. 8 charts the voltages along the central axis of the end cap reflectron according to the first embodiment of the present invention.

In operation, the reflectron 100 is placed within the vacuum chamber of a mass spectrometer and appropriate vacuum and pumping connections, as well as electrical connections, are made. When the first voltage is applied to voltage connection point 106C, a retarding electric field is created within the inner region 108, as is illustrated in FIG. 7. FIG. 8 further charts the voltages that appear along the central axis of the end cap reflectron 100 where the voltage $V_o$ is plotted as a function of the distance x from the end cap electrode in units of b, where b is the distance between the top 102 and bottom 104 electrodes. The voltage $V_o$ describes an exponential function that is substantially similar to a quadratic function. In addition, FIG. 8 illustrates that the retarding field is substantially zero when the distance x-b, so that (as described above) the depth of the reflectron is approximately the same as its width.

Ions which enter the reflectron 100 are, therefore, reflected in order to compensate for their different energies without penetrating past the conductive inner surface of top and bottom electrodes 102 and 104. Ions intended for energy-focusing by this reflectron include molecular ions and fragment ions formed in the ion source (both termed "precursor" ions) having energies differing from eV (where V=voltage applied to a backing plate (not shown) by the normal initial kinetic energy distribution, as well as "product" ions formed in a field free region, having energies approximately equal to $$\frac{m_2}{m_1}\,eV$$

where $$\frac{m_2}{m_1}$$

is the ratio of product ion mass to precursor ion mass.

While it is desirable to have the reflectron 100 of compact size as described above, a larger reflectron having a conductive top electrode 102, a conductive bottom electrode 104 and a conductive end cap 106 which are scaled to larger size can be implemented. In such cases, the length of the conductive top 102 and conductive bottom electrode 104 is approximately the same as the width (b) of the end cap electrode 106 as well as the gap between electrodes 102 and 104. Also, in general, the width of the conductive top and bottom electrodes 102 and 104 will be twice this value (b). The voltage applied to the end cap electrode 106 is dependent upon the voltage V applied to the backing plate, as described previously. The voltage applied to end cap 106 for larger reflectrons may also be larger, such that kilovolt level voltages may be applied to such a larger scale reflectron.

Figure 9:
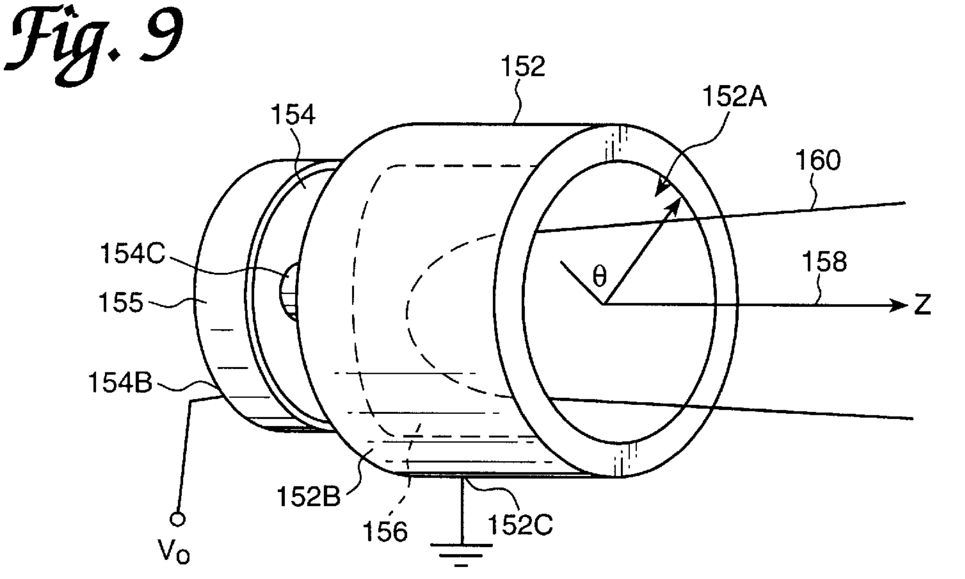
FIG. 9 illustrates a reflectron using an end cap according to a second embodiment of the present invention.

FIG. 9 illustrates a second embodiment of an end cap reflectron 150 according to the present invention. This reflectron 150 includes a cylindrical conductive electrode 152 and a circular conductive end cap 154. The cylindrical conductive electrode 152 and the circular conductive end cap 154 are each formed of 0.25" thick stainless steel and form an inner region 156 having a cylindrical shape. The cylindrical conductive electrode 152 is electrically isolated from the circular conductive end cap 154, with an insulator 155 preferably made of about 0.1" of empty space, but can also be ceramic or other non-conductive material, so that a retarding electric field can be established when voltages are applied thereto, as discussed hereinafter.

Figure 1:
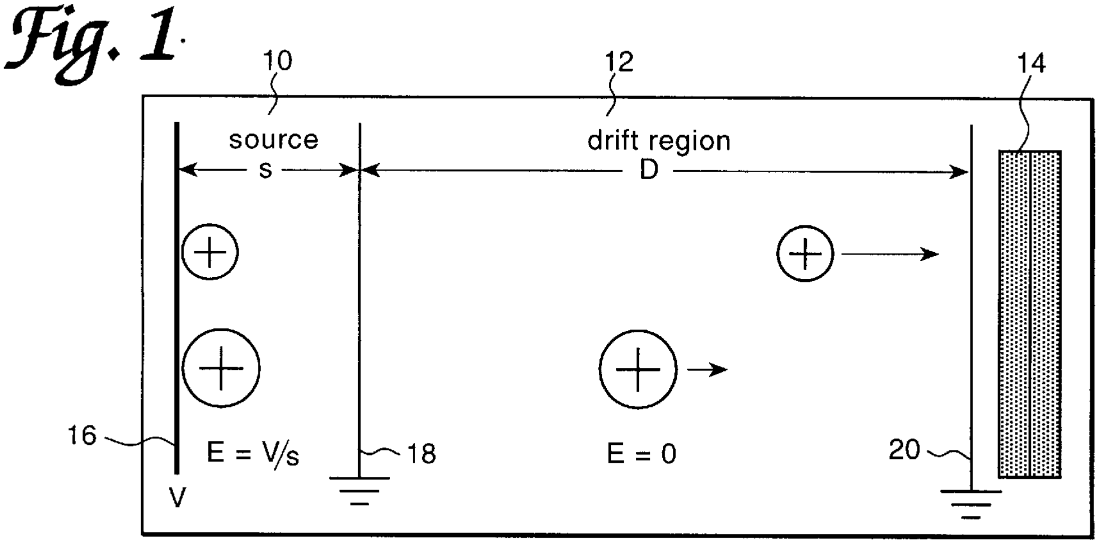
FIG. 1 illustrates a functional schematic of a time-of-flight mass spectrometer.
Figure 2A:
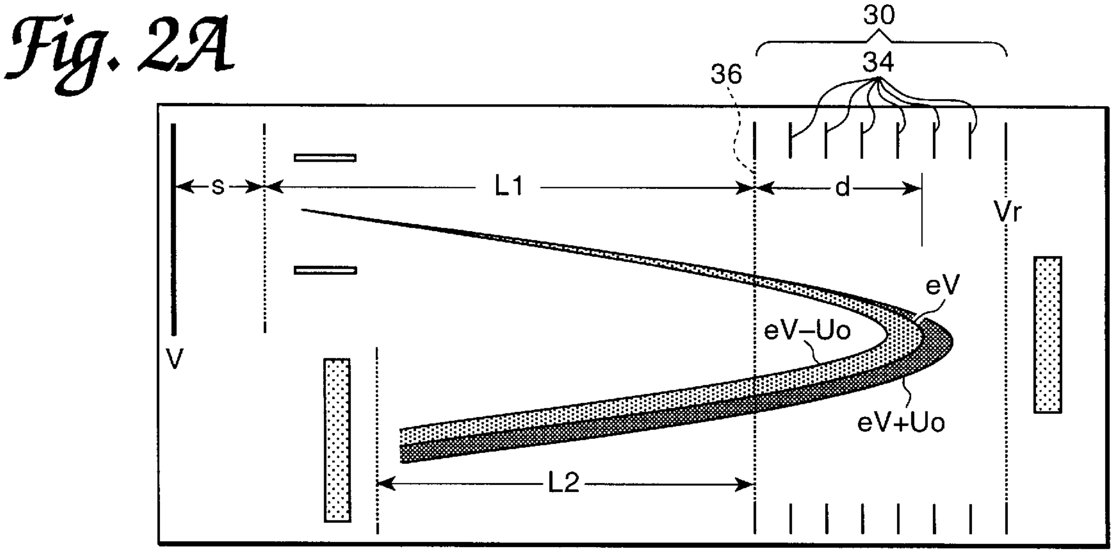
FIGS. 2A and 2B illustrate functional schematics of time-of-flight mass spectrometers having single and dual stage reflectrons, respectively.
Figure 2B:
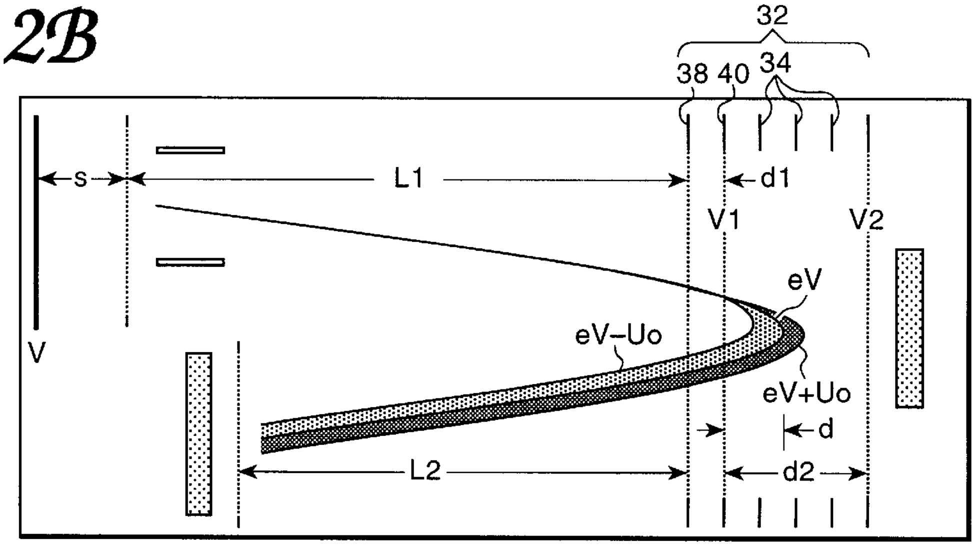
Figure 3A:
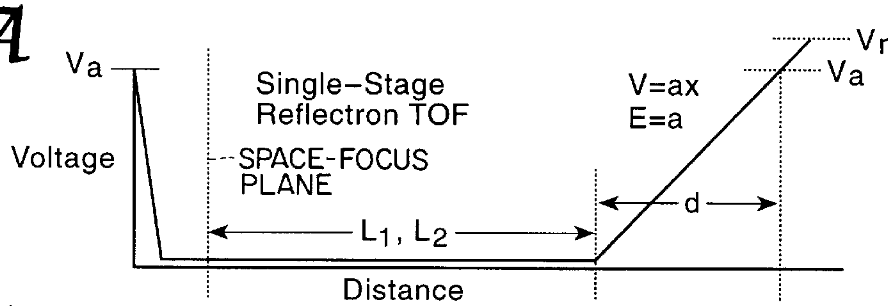
FIGS. 3A–3D illustrate the potential (voltages) for a time-of-flight mass spectrometer incorporating single stage, dual stage, quadratic and curved field reflectron retarding voltages, respectively, as a function of the distance along the time-of-flight axis.
Figure 3B:
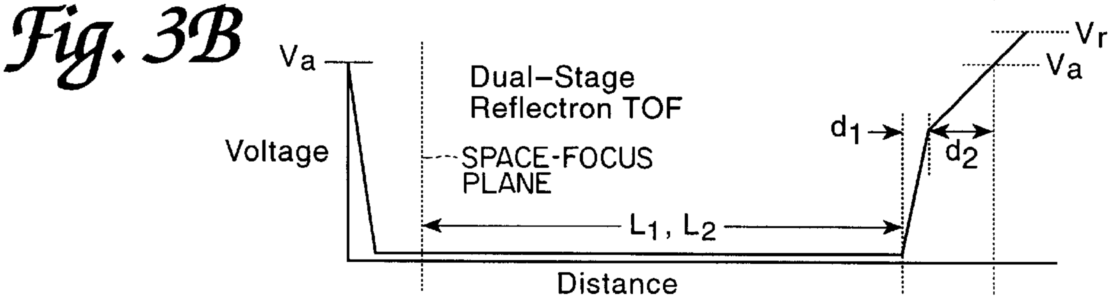
Figure 3C:
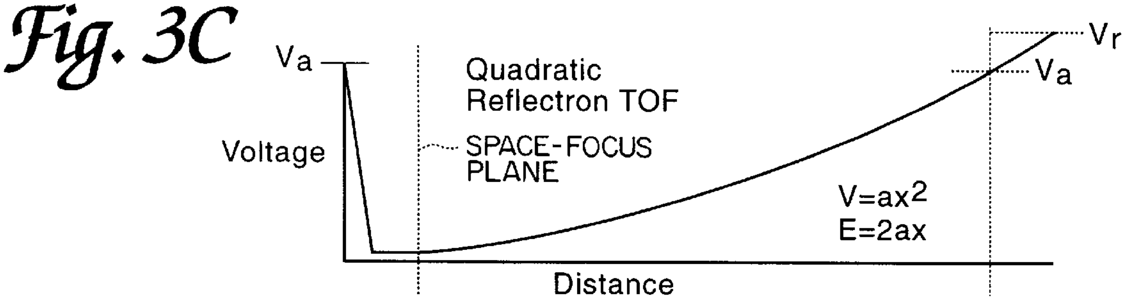
Figure 3D:
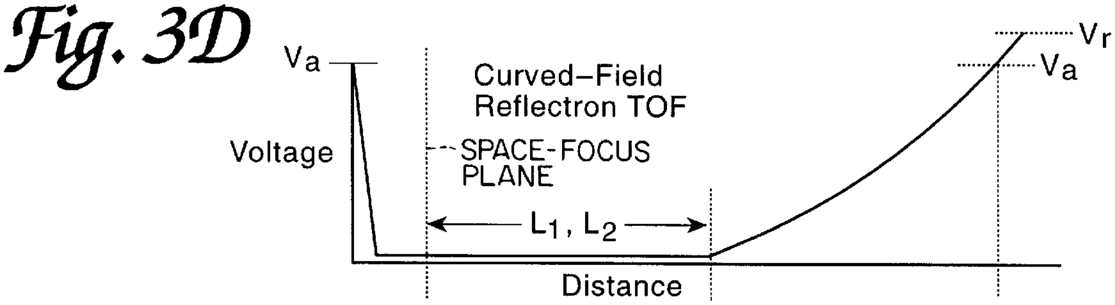
Figure 4:
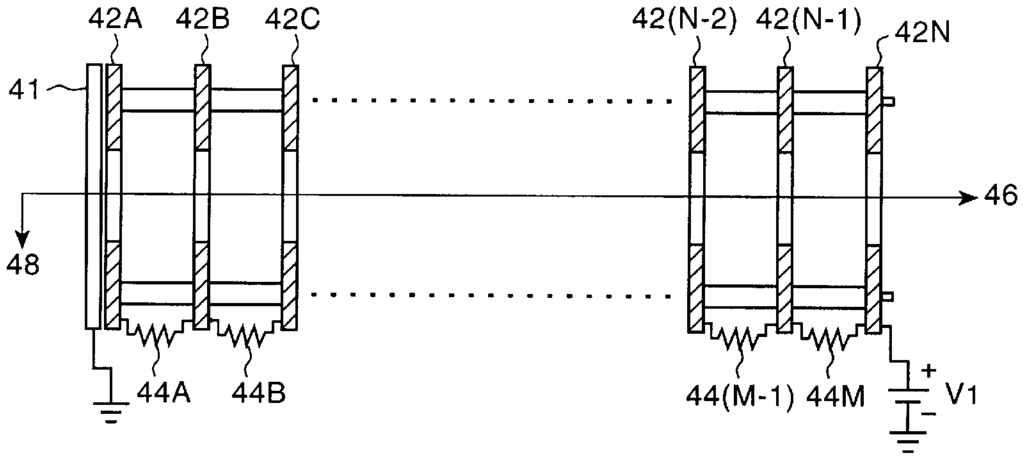
FIG. 4 illustrates a conventional reflectron having multiple electrodes used to obtain retarding electric fields.
Figure 5A:
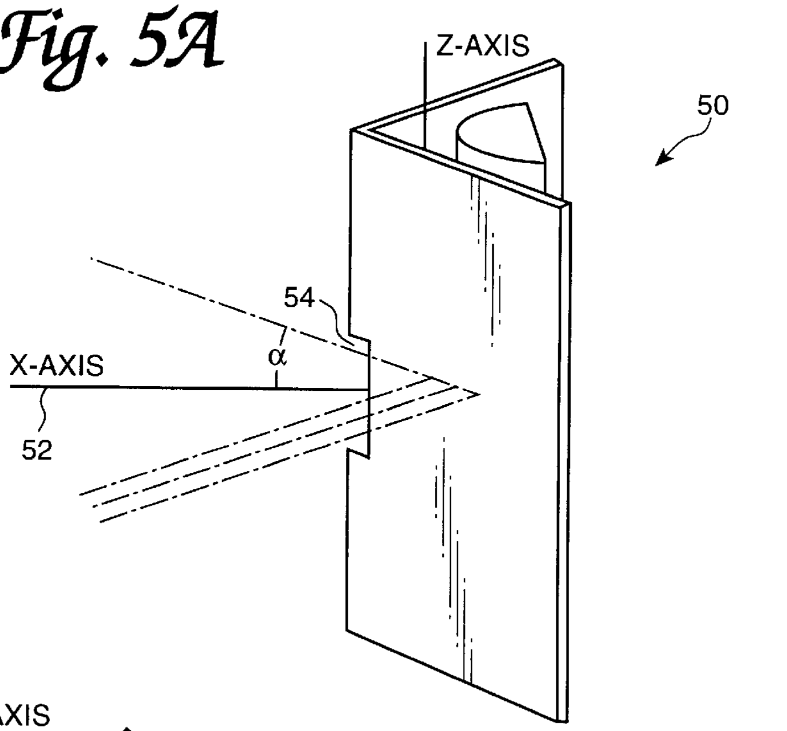
FIGS. 5A and 5B illustrate a proposed quadratic reflectron.
Figure 5B:
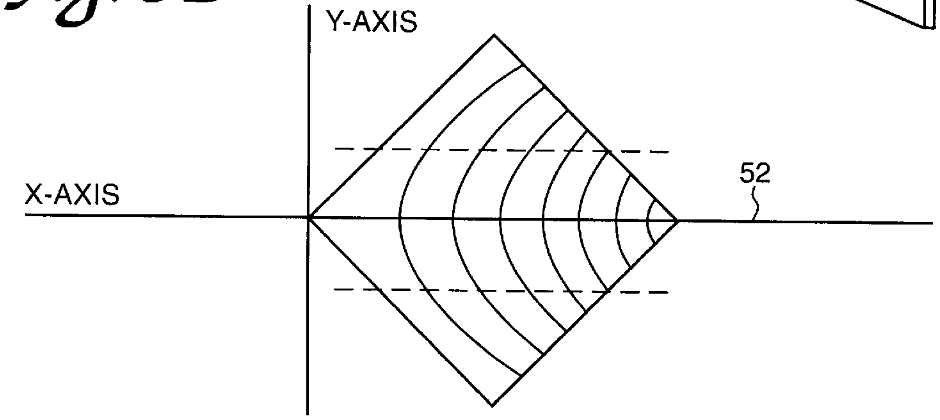

The circular conductive end cap 154 has a diameter of 1.70", which diameter allows it to fit within the cylindrical conductive electrode 152, which has an inner diameter of 1.75", thus leaving a small gap between conductive electrode 152 and end cap 154 and an outer diameter of 2.25". The circular conductive end cap 154 is adjustably moveable within the cylindrical conductive electrode 152, which advantageously permits the length adjustment of the reflectron depth to tune the focal length to match the combined distances of the linear regions such as L1 and L2 illustrated in FIGS. 2A and 2B outside the reflectron so that focusing of the ions can be easily accomplished. The length of the cylindrical conductive electrode 152 is 2.0". For a reflectron of the scale described herein, the circular end cap 154 can have a diameter within the range of 1.2"–2.5" and the length of the cylindrical conductive electrode 152 can be in the range of about 2.0"–3.5".

The conductive electrode 152 creates an ion entrance/exit end 152A and the end cap 154 is inserted from the opposite end 152B. A connection 152C electrically connects conductive electrode 152 to ground.

A voltage conductor connects to the end cap 154 at a conductor connection point 154B, which point is preferably located on the back surface of the end cap. The voltage applied via the connection point 154B to the circular conductive end cap 154 will in general be a DC voltage having a level greater in magnitude than the voltage V applied to the backing plate 204A illustrated in FIG. 12 and preferably be 10% greater in magnitude than the backing plate voltage. For these electrode dimensions, backing plate voltages of about 150–2000 volts are used.

Also illustrated in FIG. 9 is a hole 154C in the circular conductive end cap 154 which advantageously allows a laser beam to enter through the circular conductive end cap 154 via the hole 154C. Hole 154C has no effect on the non-linear electric field established in the inner region 156.

Figure 10:
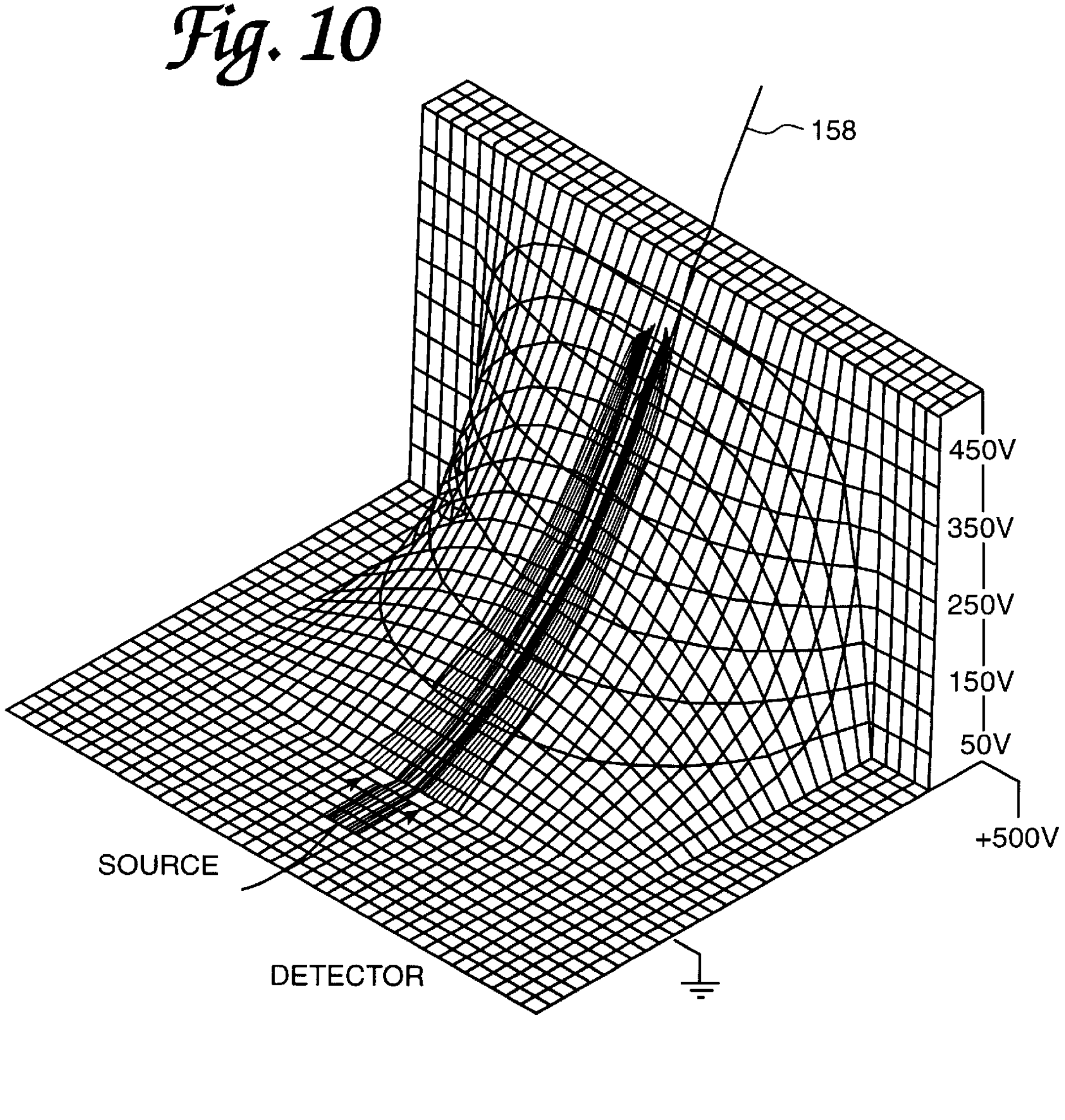
FIG. 10 illustrates the equipotential lines obtained using the end cap reflectron according to the second embodiment of the present invention.
Figure 11:
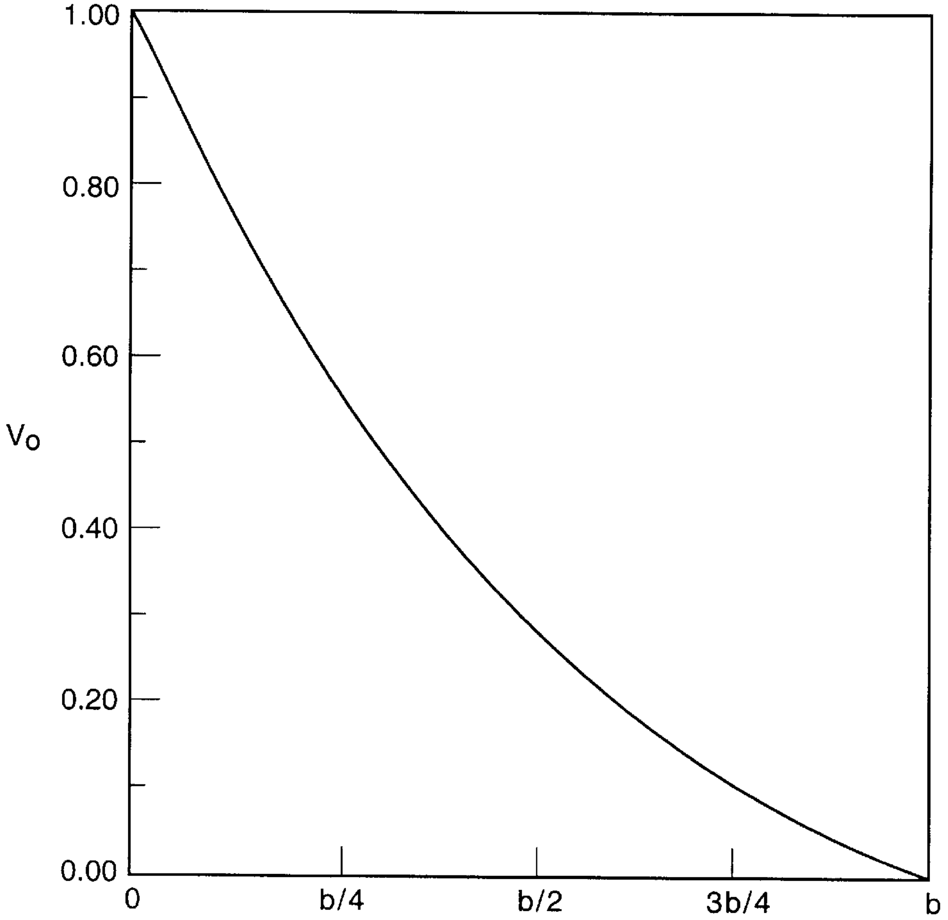
FIG. 11 charts the voltages along the central axis of the end cap reflectron according to the second embodiment of the present invention.

In operation, the reflectron 150 is placed within the vacuum chamber of a mass spectrometer and appropriate vacuum and pumping connections, as well as electrical connections, are made. When the first voltage is applied to voltage connection point 154B, a retarding electric field is created within the inner region 156, as is partially illustrated in FIG. 10. FIG. 11 further charts the voltages that appear along the central axis 158 of the end cap reflectron 150. Ions which enter the reflectron 150 are, therefore, reflected in order to compensate for their different energies. Ions intended for energy-focusing by this reflectron include molecular ions and fragment ions formed in the ion source (both termed “precursor” ions) having energies differing from eV (where V=voltage on the backing plate 204A) by the normal initial kinetic energy distribution, as well as “product” ions formed in the field free region, having energies approximately equal to $$\frac{m_2}{m_1}\,eV$$

where $$\frac{m_2}{m_1}$$

is the ratio of product ion to precursor ion mass.

While it is desirable to have the reflectron 150 of compact size as described above, a larger reflectron, having a cylindrical conductive electrode 152 and a circular conductive end cap 154 which are scaled to larger size, can be implemented. In general, the inside depth of the reflectron will be approximately the same as its inside diameter. In effect, this means that the length of the cylindrical conductive electrode 152 will be slightly larger than the diameter of the end cap 154 to permit the end cap 154 to be inserted inside the cylindrical conductive electrode 152. The voltage applied to the end cap 154 is dependent upon the value of the voltage V applied to the backing plate 16. The voltage applied to end cap 154 for larger reflectrons may also be larger, such that kilovolt level voltages may be applied to such a larger scaled reflectron.

Figure 12:
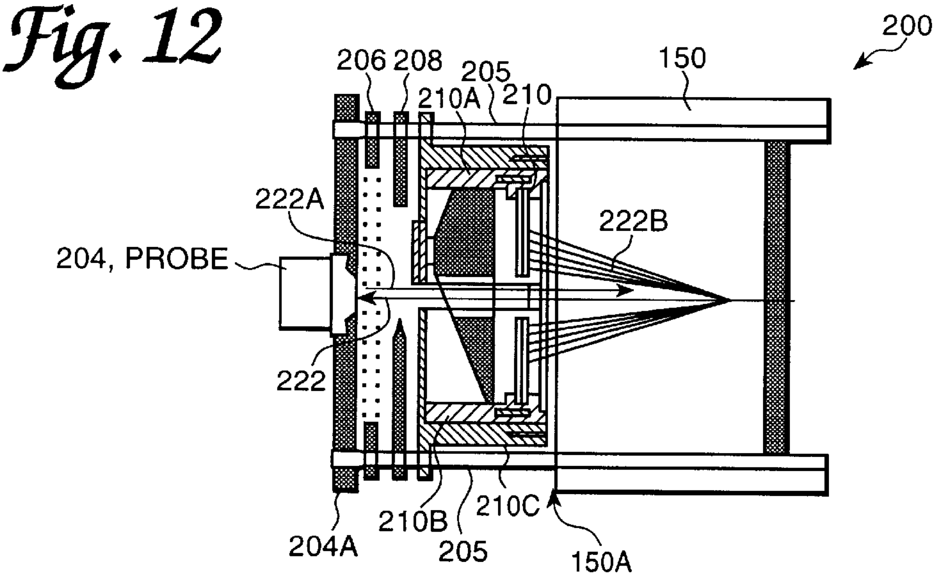
FIGS. 12, 13 and 14 illustrates a mass spectrometer and its optics using an end cap reflectron according to the second embodiment of the present invention.
Figure 13:
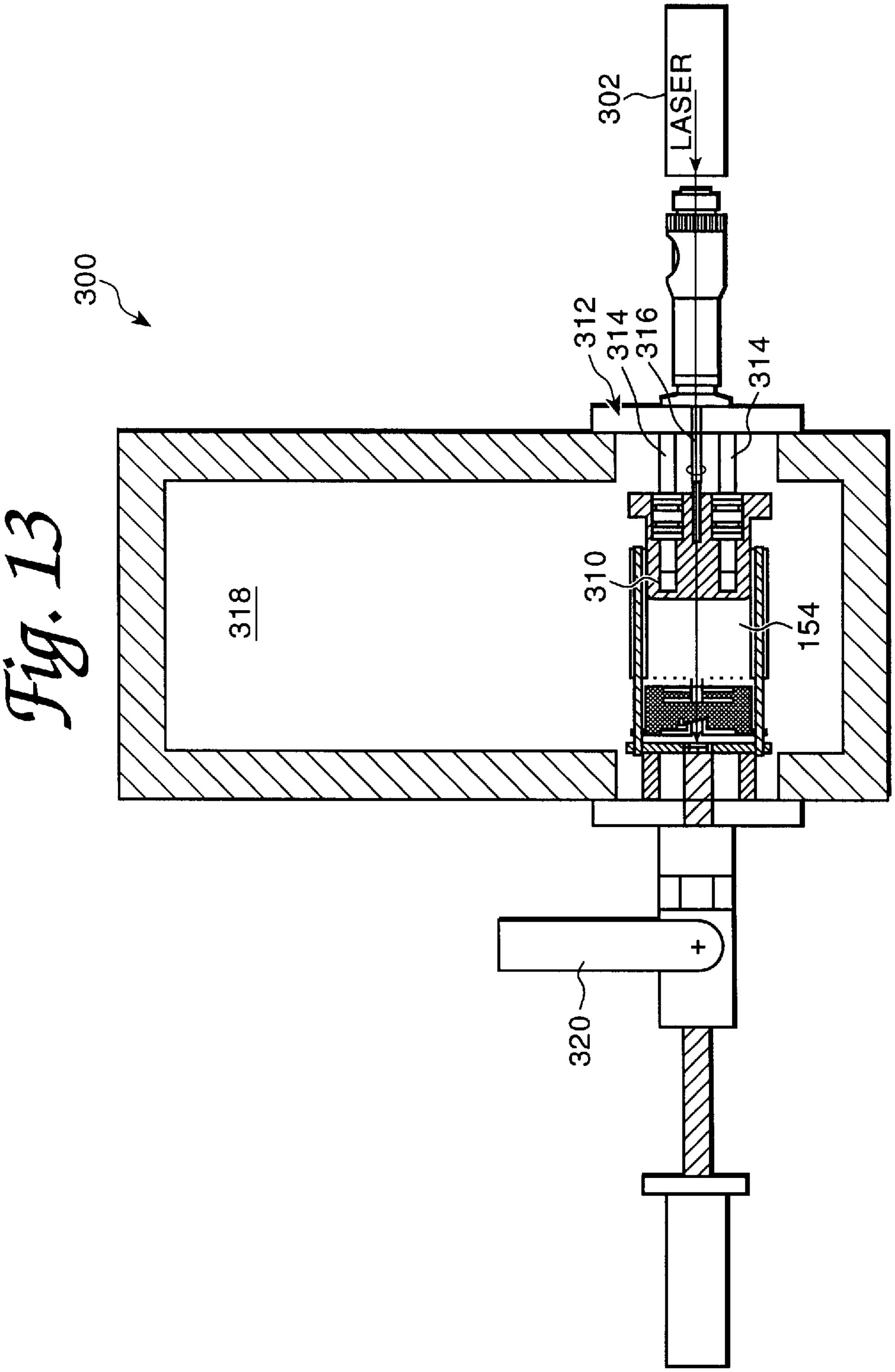
Figure 14:
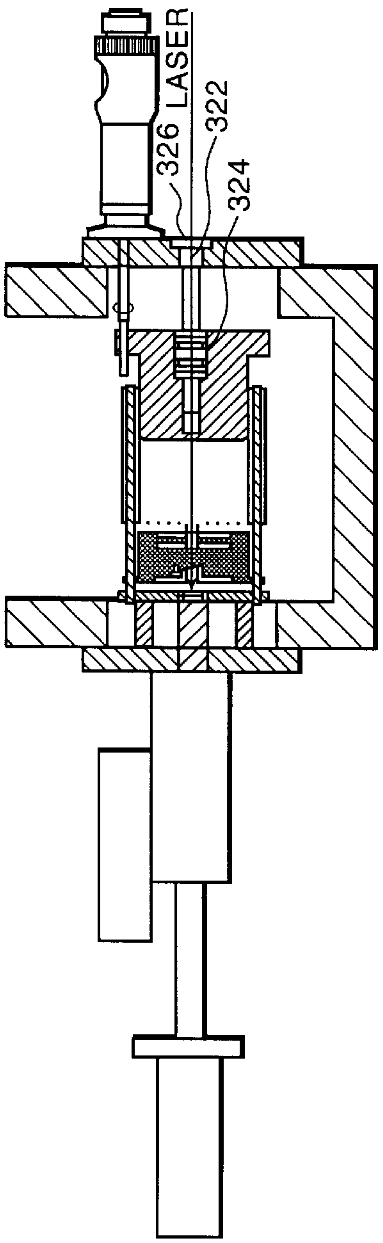

FIGS. 12, 13 and 14 illustrate the mass spectrometer optics 200 configured to record the mass spectra of product ions. A laser 302 is used to form precursor ions from a probe 204 which contains the material of interest. These ions are extracted and focused by electrodes 206 causing them to travel along path 222A during which time some of these ions will fragment, forming product ions. Both precursor and product ions travel through the center hole of a coaxial channelplate detector 210 and enter the reflectron 150, where they are reflected back along path 222B and detected by the channelplate detector 210. Precursor ions will all be focused at the detection surface 210, while product ions formed by fragmentation in the field free region bounded by the extraction lenses 206 and the entrance to the reflectron 150A will also be focused. In addition, a deflection electrode 208 located at the space focus plane can be used to select precursor ions of a given mass, thus limiting the recovery of product ions to only those product ions formed from a given precursor. Additionally, the detection channelplates 210 are mounted in a detection assembly that includes a conical anode 210A, a cylindrical non-conducting mounting 210B that holds and spaces the channelplates 210 and conical anode 210A, and a grounded cylindrical shield 210C. The probe 204 is mounted flush with the surface of the backing plate 204A to which the backing plate voltage V is applied. All elements of the mass spectrometer optics 200 are mechanically connected (but electrically isolated) by a set of four ceramic rods 205.

FIGS. 13 and 14 both illustrate the mass spectrometer optics 200 mounted in the vacuum chamber of the whole mass spectrometer assembly 300. In this diagram the end cap 154 is mounted on a plunger 310 made of an insulating material. The location of end cap 154 inside the reflectron cylindrical is adjusted using an adjustment assembly 312 containing a guide 314 that connects to plunger 310 and an adjustment screw 316 which threadably inserts into plunger 310. The probe 204 is connected through the vacuum chamber wall 318 via a vacuum interlock 320. The plunger 310 contains an open region 324 and the adjustment assembly 312 contains a hole 322 which cooperate with the hole 154C in the circular end cap 154 so that injection of a laser beam is possible. A window 326 provided in the adjustment assembly 312 to cover hole 322 ensures that vacuum conditions are maintained.

Figure 15C:
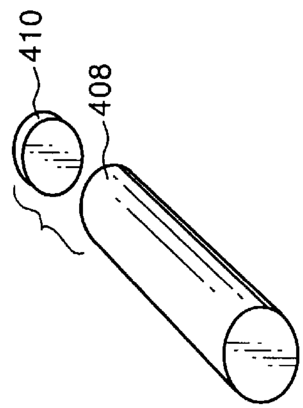
FIGS. 15A–15C illustrate different conductive surface shapes used to establish the inner region in which there exists the retarding electric field according to the present invention.
Figure 15B:
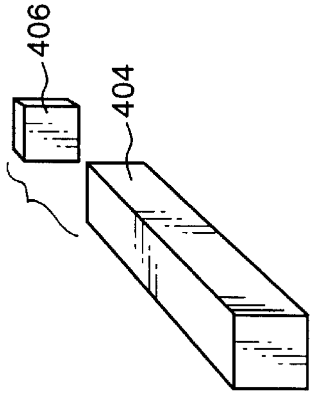
Figure 15A:
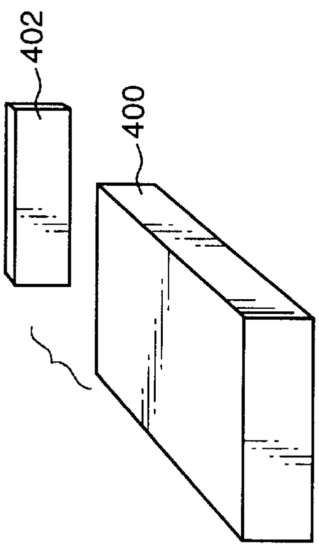

FIGS. 15A–15C illustrate examples of different shapes of conductive surfaces that can be used with a correspondingly shaped end cap so that an inner region having a substantially quadratic electric field exists. FIG. 15A illustrates a tube 400 with a rectangular cross-sectional conductive inner surface and a correspondingly shaped rectangular end cap 402. FIG. 15B illustrates a tube 404 with a square cross-sectional conductive inner surface and a correspondingly shaped square end cap 406. FIG. 15C illustrates a tube 408 with an oval cross-sectional conductive inner surface and a correspondingly shaped oval end cap 410. Other cross-sectional conductive inner surface shapes are intended to be within the scope of present invention.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

We claim:

1. A reflectron for use with a mass spectrometer that focuses ions having different energies comprising:

a conductive end cap electrically connected to a first voltage and having an end cap inner surface;

a conductive surface electrically isolated from said conductive end cap and connected to a second voltage, said conductive surface and said end cap inner surface defining an inner region in which a non-linear electric field exists so that said ions having different energies enter and exit said inner region at an opening formed in said conductive surface and, when within said inner region, are reflected out of said opening as a result of said electric field without penetrating past said conductive surface.

2. A reflectron according to claim 1 wherein said second voltage is ground potential and said first voltage is a DC voltage having a magnitude greater than said second voltage so that a non-linear electric field having a substantially quadratic voltage dependence on depth is established along an ion flight path within said inner region.

3. A reflectron according to claim 2 wherein said conductive end cap is adjustably moveable relative to said conductive surface.

4. A reflectron according to claim 1 wherein said conductive surface has a tubular shape and said conductive end cap has a shape corresponding to said tubular shape.

5. A reflectron according to claim 4 wherein said conductive end cap is adjustably moveable within said tube to permit adjustment of the focal length of said reflectron without changing said first voltage.

6. A reflectron according to claim 4 wherein said second voltage is ground potential and said first voltage is a DC voltage having a magnitude greater than said second voltage so that a non-linear electric field having a substantially quadratic voltage dependence on depth is established along an ion flight path within said inner region.

7. A reflectron according to claim 6 wherein said conductive surface is substantially perpendicular to said end cap inner surface.

8. A reflectron according to claim 7 wherein said conductive surface has a length between 2.0"–3.5'.

9. A reflectron according to claim 8 wherein said second voltage is ground potential and said first voltage is a DC voltage having a magnitude greater than said second voltage so that a non-linear electric field having a substantially quadratic voltage dependence on depth is established along an ion flight path within said inner region.

10. A reflectron according to claim 5 wherein said diameter is between 1.2"–2.5" and said conductive surface has a length between 2.0"–3.5".

11. A reflectron according to claim 4 wherein said end cap has one of a circular, rectangular or square shape.

12. A reflectron according to claim 1 wherein said end cap has a substantially rectangular shape, said conductive surface is a pair of parallel electrodes and said inner region has a substantially boxlike shape.

13. A reflectron according to claim 12 wherein said second voltage is ground potential and said first voltage is a DC voltage having a magnitude greater than said second voltage so that a non-linear electric field having a substantially quadratic voltage dependence on depth is established along an ion flight path within said inner region.

14. A reflectron according to claim 12 wherein said wherein said rectangularly shaped end cap has a length between 1.5"–2.5" and a width of at least 4.0" and each of said pair of parallel electrodes project from said end cap inner surface at least 1.5".

15. A reflectron according to claim 13 wherein said rectangularly shaped end cap is adjustably moveable between said pair of parallel electrodes to permit adjustment of a focal length of said reflectron without changing said first voltage.

16. A reflectron for use with a mass spectrometer that focuses ions having different energies comprising:

a conductive end cap electrically connected to a first voltage and having an end cap inner surface;

a conductive surface electrically isolated from said conductive end cap and connected to a second voltage, said conductive surface and said end cap inner surface defining an inner region in which a non-linear electric field exists so that said ions having different energies enter and exit said inner region at an opening and said non-linear electric field can be focussed by adjustment of a location of said conductive end cap relative to said conductive surface without changing said first voltage.

17. A reflectron according to claim 16 wherein said second voltage is ground potential and said first voltage is a DC voltage having a magnitude greater than said second voltage so that a non-linear electric field having a substantially quadratic voltage dependence on depth is established along an ion flight path within said inner region.

18. A reflectron according to claim 17 wherein said conductive surface has a tubular shape and said conductive end cap has a shape corresponding to said tubular shape.

19. A reflectron according to claim 18 wherein said end cap has one of a circular, rectangular or square shape.

20. A reflectron for use with a mass spectrometer that focuses ions having different energies comprising:

a conductive end cap electrically connected to a first voltage and having an end cap inner surface; and a tubular electrode electrically isolated from said conductive end cap and electrically connected to a second voltage, said tubular electrode including:

an inner surface, a first end cap connection end by which is disposed said conductive end cap so that said inner surface is substantially perpendicular to said end cap inner surface, said end cap inner surface and at least a portion of said tubular electrode inner surface defining an inner region in which a non-linear electric field exists, and a first ion entrance end opposite said first end cap connection end which forms an opening so that said ions having different energies enter and exit said inner region at said opening.

21. A reflectron according to claim 20 wherein said second voltage is ground potential and said first voltage is a DC voltage having a magnitude greater than said second voltage so that a non-linear electric field having a substantially quadratic voltage dependence on depth is established along an ion flight path within said inner region.

22. A reflectron according to claim 20 wherein said conductive end cap is adjustably moveable within said inner surface to permit adjustment of a focal length of said reflectron without changing said first voltage.

23. A reflectron according to claim 22 wherein said second voltage is ground potential and said first voltage is a DC voltage having a magnitude greater than said second voltage so that a non-linear electric field having a substantially quadratic voltage dependence on depth is established along an ion flight path within said inner region.

24. A reflectron according to claim 20 wherein said inner surface is cylindrical and has a diameter of between 1.2"–2.51" and said cylindrical inner surface has a length between 2.0"–3.5".

25. A reflectron according to claim 20 wherein said end cap has one of a rectangular, square and oval shape.

26. A mass spectrometer for determining characteristics of interest in a material comprising:

a support for holding said material;

a laser which directs a laser beams at said material in said holder so that ions having different energies result therefrom;

a reflectron for focusing said ions having different energies to obtain focused ions, said reflectron comprising:

a conductive end cap electrically connected to a first voltage and having an end cap inner surface; and a tubular electrode electrically isolated from said conductive end cap by said insulator and electrically connected to a second voltage, said tubular electrode including:

a cylindrical inner surface, a first end cap connection end by which is disposed said conductive end cap so that said inner surface is substantially perpendicular to said end cap inner surface, said end cap inner surface and at least a portion of said cylindrical inner surface defining an inner region in which a non-linear electric field exists, and a first ion entrance end opposite said first end cap connection end which forms an opening so that said ions having different energies enter and exit said inner region at said opening; and a detector which detects said focused ions that are used to determine said characteristics of interest.

27. A mass spectrometer according to claim 26 wherein said second voltage is ground potential and said first voltage is a DC voltage having a magnitude greater than said second voltage so that a non-linear electric field having a substantially quadratic voltage dependence on depth is established along an ion flight path within said inner region.

28. A mass spectrometer according to claim 26 wherein said end cap is adjustably moveable within said tubular electrode to permit adjustment of a focal length of said reflectron without changing said first voltage.

29. A mass spectrometer according to claim 28 wherein said second voltage is ground potential and said first voltage is a DC voltage having a magnitude greater than said second voltage so that a non-linear electric field having a substantially quadratic voltage dependence on depth is established along an ion flight path within said inner region.

30. A method of focusing ions having different energies with a reflectron comprising the steps of:

creating a non-linear electric field in a reflectron, said reflectron including:

a conductive end cap electrically connected to a first voltage and having an end cap inner surface;

a conductive surface electrically isolated from said conductive end cap and electrically connected to a second voltage, said conductive surface and said end cap inner surface defining an inner region in which said non-linear electric field exists; and projecting ions having different energies into said inner region at an opening formed in said inner region of said reflectron to cause reflection of said ions in said reflectron and out of said opening without said ions penetrating past said conductive surface.

31. A method according to claim 30 further including the steps of:

determining a distance of a focal length of a linear region of a mass spectrometer associated with said reflectron; and adjusting a location of said conductive end cap relative to said conductive surface without changing said first voltage.

* * * * *